(12) United States Patent
Kinney et al.

(10) Patent No.: US 11,300,394 B2
(45) Date of Patent: Apr. 12, 2022

(54) AMMUNITION CASE TRIMMER

(71) Applicant: AOB Products Company, Columbia, MO (US)

(72) Inventors: Timothy S. Kinney, Warrenton, MO (US); James Tayon, Moberly, MO (US); Michael Cottrell, Ashland, MO (US); Dennis W. Cauley, Jr., Fayette, MO (US); Justin Burke, Columbia, MO (US); Brian Steere, Columbia, MO (US); Kyle Martin, Columbia, MO (US); Anthony Vesich, Columbia, MO (US); Matthew Kinamore, Columbia, MO (US); Curtis Smith, Columbia, MO (US)

(73) Assignee: AOB Products Company, Columbia, MO (US)

( * ) Notice: Subject to any disclaimer, the term of this patent is extended or adjusted under 35 U.S.C. 154(b) by 0 days.

(21) Appl. No.: 17/124,657

(22) Filed: Dec. 17, 2020

(65) Prior Publication Data

US 2021/0180930 A1 Jun. 17, 2021

Related U.S. Application Data

(60) Provisional application No. 62/949,174, filed on Dec. 17, 2019.

(51) Int. Cl.
*F42B 33/10* (2006.01)
*B23B 5/16* (2006.01)
*F42B 35/02* (2006.01)

(52) U.S. Cl.
CPC ............. *F42B 33/10* (2013.01); *B23B 5/168* (2013.01); *F42B 35/02* (2013.01); *B23B 2215/10* (2013.01)

(58) Field of Classification Search
CPC .......... F42B 35/02; F42B 33/10; B23B 5/168; B23B 2215/10
See application file for complete search history.

(56) References Cited

U.S. PATENT DOCUMENTS

| 2,359,931 A | 10/1944 | Moffitt |
| 2,744,307 A | 5/1956 | Smiley |
| 3,157,407 A | 11/1964 | Aulabaugh |

(Continued)

FOREIGN PATENT DOCUMENTS

CH 687479 A5 * 12/1996 .............. F42B 35/02

OTHER PUBLICATIONS

Squibloads Gun Thoughts, What is the Best Case Trimmer?, http://squibloads.wordpress.com/reloading/what-is-the-best-case-trimmer/, 7 pages, admitted prior art [internet accessed Jul. 15, 2014].

(Continued)

*Primary Examiner* — Joshua T Semick
(74) *Attorney, Agent, or Firm* — Stinson LLP (57) ABSTRACT

An ammunition case trimmer, components thereof, and associated methods. The ammunition case trimmer includes a shroud and a cutter. The cutter is supported in the shroud by at least one rotational bearing. The shroud defines a case guide for receiving the case and guiding the case into engagement with a cutting head of the cutter. The shroud is rotatable with respect to the cutter about the axis of rotation. A proximal free end of the cutter is arranged with respect to the shroud to permit reception of the proximal free end in a chuck of a drill.

26 Claims, 5 Drawing Sheets

(56) References Cited

U.S. PATENT DOCUMENTS

| | | | |
|---|---|---|---|
| 3,174,390 A | 3/1965 | Jacobsen | |
| 3,274,661 A | 9/1966 | Westbrook | |
| 4,325,282 A | 4/1982 | Schaenzer | |
| 4,653,157 A | 3/1987 | Alexander | |
| 4,686,751 A | 8/1987 | Gracey | |
| 5,309,813 A | 5/1994 | Henley | |
| 5,497,539 A | 3/1996 | Blodgett et al. | |
| 5,718,423 A | 2/1998 | Blodgett et al. | |
| 5,727,295 A | 3/1998 | Gracey | |
| 5,788,429 A | 8/1998 | Gracey | |
| 6,101,915 A | 8/2000 | Sinclair | |
| 6,484,616 B1 * | 11/2002 | Giraud | B23P 23/02 86/19.5 |
| 7,155,789 B1 | 1/2007 | Gracey | |
| 7,650,825 B1 | 1/2010 | Lee et al. | |
| 8,408,112 B2 | 4/2013 | Keska | |
| 8,827,607 B1 | 9/2014 | Goodman | |
| 9,022,704 B1 | 5/2015 | Goodman | |
| 9,146,087 B2 | 9/2015 | Cottrell et al. | |
| 9,157,709 B2 | 10/2015 | Nuetzman et al. | |
| 9,234,731 B2 | 1/2016 | Keska | |
| 9,459,082 B2 | 10/2016 | Giraud | |
| 9,541,365 B2 | 1/2017 | Giraud | |
| 9,696,124 B2 | 7/2017 | Keska | |
| 9,970,741 B1 | 5/2018 | Eldredge | |
| D826,670 S | 8/2018 | Goodman | |
| 2011/0232467 A1 | 9/2011 | Keska | |

OTHER PUBLICATIONS

Dillon's Rapid Trim 1200B Case Trimmer: Case Preparation Equipment, http://www.dillonprecision.com/content/p/9/pid/23636/catid/8/Dillon_039_s_Rapid_Trim_1200B_Case_Trimmer, 1 page, admitted prior art [internet accessed Jul. 15, 2014].

Giraud Tool Company, Inc., Giraud Powered Case Trimmer, http://www.giraudtool.com/Giraud%20Trimmer.pdf, 9 pages, admitted prior art.

Match Prep, Home of the Gracey Power Cartridge Case Trimmer, http://www.matchprep.com/trimmer.htm, 1 page, admitted prior art [internet accessed Mar. 19, 2014].

Lyman Case Trim Xpress, Instruction Manual, 12 pages, Mar. 2019.

* cited by examiner

AMMUNITION CASE TRIMMER

CROSS-REFERENCE TO RELATED APPLICATION

The present application claims priority to U.S. Provisional Patent App. No. 62/949,174, filed Dec. 17, 2019, which is hereby incorporated by reference in its entirety.

FIELD

The present disclosure generally relates to equipment for preparing ammunition cases, and more particularly to a trimmer for trimming ammunition cases.

BACKGROUND

After a round of ammunition has been fired, a casing or case of the round may be re-used by reloading it with a primer, a propellant, and a bullet. As an initial step in the re-loading process, the mouth of a case may need to be trimmed to reduce the length of the case and/or square the opening of the mouth with the longitudinal axis of the case. It is desirable to achieve precise and consistent trimming of cases and to provide them with a square mouth for proper firing of re-loaded rounds of ammunition and potentially increased firing accuracy.

SUMMARY

In one aspect, an ammunition case trimmer for use with a drill including a chuck comprises a cutter and a shroud. The cutter includes a cutting head and a shaft extending proximally from the cutting head. The cutter is rotatable about an axis of rotation. The shroud supports the cutter and includes a case guide defining a mouth for receiving an ammunition case to be trimmed. The case guide includes a case engagement surface arranged to locate the case with respect to the cutting head. The shroud includes a cutter housing extending proximally of the case guide. The case guide is selectively movable with respect to the cutter housing to move the case engagement surface axially for changing a length to be trimmed from the ammunition case. A first rotational bearing supports the cutter in the cutter housing for rotation about the axis of rotation. The first rotational bearing permits conjoint rotation of the cutter housing and the case guide with respect to the cutter about the axis of rotation. The cutter includes a proximal free end arranged with respect to the shroud to be received in the chuck of the drill for rotating the cutting head.

In another aspect, an ammunition case trimmer for use with a drill including a chuck comprises a cutter and a shroud. The cutter includes a cutting head and a shaft extending proximally from the cutting head. The cutter is rotatable about an axis of rotation. The shroud at least partially houses the cutter. The shroud includes a case guide defining a mouth configured to receive an ammunition case to locate the ammunition case with respect to the cutting head to be trimmed by the cutting head. A first rotational bearing supports the cutter for rotation with respect to the shroud about the axis of rotation. A first shoulder is arranged to engage the first rotational bearing to limit axial movement of the cutter with respect to the bearing. The cutter has a proximal free end arranged with respect to the shroud for being received in the chuck of the drill.

In yet another aspect, an ammunition case trimmer for use with a drill including a chuck comprises a cutter and a shroud. The cutter includes a cutting head and a shaft extending proximally from the cutting head. The cutter is rotatable about an axis of rotation. The shroud at least partially houses the cutter. The shroud includes a case guide defining a mouth configured to receive an ammunition case to locate the ammunition case with respect to the cutting head to be trimmed by the cutting head. A first rotational bearing supports the cutter for rotation of the cutter with respect to the shroud about the axis of rotation. A first retainer is releasably connected to the shroud and arranged to limit proximal movement of the rotational bearing with respect to the shroud. The cutter has a proximal free end arranged with respect to the shroud for being received in the chuck of the drill.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Referring to FIGS. 1-4, a firearm ammunition case trimmer is designated generally by the reference number 10. The trimmer 10 can be used on a drill press or a handheld drill to trim ammunition cases. As explained in further detail below, the trimmer 10 is adjustable for trimming cases of a wide variety of cartridges of varying body, neck, shoulder, and mouth dimensions and for ensuring the case mouths of the cases are trimmed square to longitudinal axes of the cases.

Figure 1:
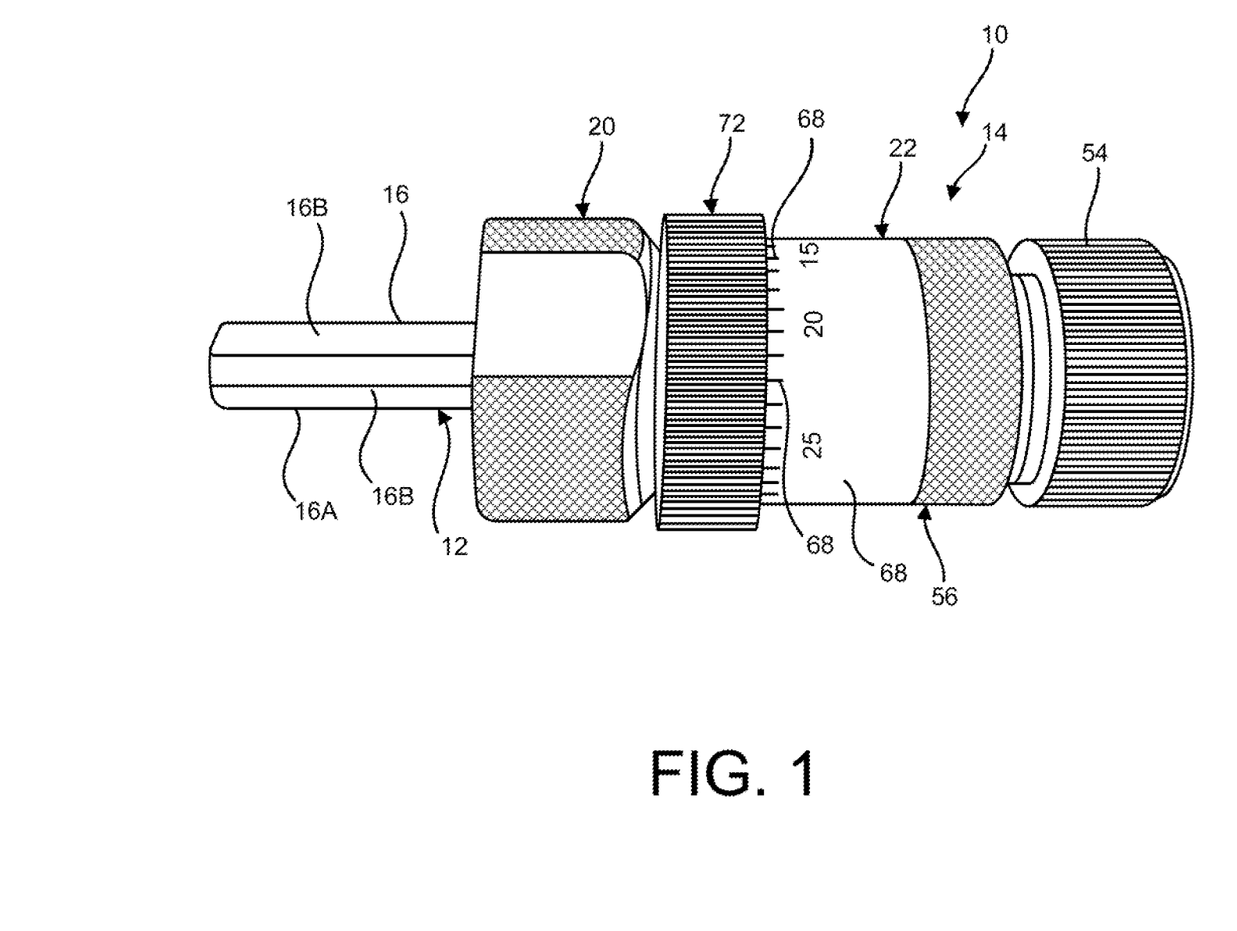
FIG. 1 is a perspective of an ammunition case trimmer of the present disclosure.

As shown in FIG. 1, the trimmer 10 includes a cutter 12 and a shroud 14. As will become apparent, the cutter 12 is rotatable by a drill (e.g., handheld drill or drill press), and the shroud 14 houses the cutter and defines a case opening into which a case can be inserted for trimming the case on the cutter. The shroud 14 is rotatable with respect to the cutter 12 so the shroud can remain stationary as the cutter turns inside the shroud. In one example, a user can apply their hand to the shroud 14 while the cutter 12 is rotating such that the user's hand prevents rotation of the shroud, but the cutter is not prevented from rotating.

The cutter 12 includes a shaft 16 and a cutting head 18 at a distal end of the shaft. In the illustrated embodiment, the cutting head 18 is formed separately from the shaft 16 and is threaded into a socket in the end of the shaft. A proximal free end 16A of the cutter shaft 16 is exposed outside the shroud 14 and extends proximally of the shroud for being received in a chuck of a drill. A proximal end of the shroud 14 terminates distally from the proximal free end 16A of the cutter shaft 16, so the proximal free end of the cutter shaft is exposed for reception in a chuck of a drill. The proximal free end 16A of the cutter shaft 16 is the proximal most part of the trimmer 10. Desirably, the proximal end 16A of the cutter shaft 16 includes at least one flat 16B (in the illustrated embodiment, three flats 16B) for engagement by the chuck of the drill to facilitate gripping of the shaft by the chuck. The cutter 12 has a longitudinal axis LA about which the cutter rotates by a driving force from the drill. The cutter shaft 16 includes a proximally facing shoulder 16B and an annular groove 16C for reasons which will be explained below.

In the illustrated embodiment, the shroud 14 includes a generally tubular cutter housing 20 and a generally tubular case housing 22 connected to each other by a threaded connection. A proximal end of the cutter housing 20 defines a proximal end of the shroud 14 and houses intermediate and distal portions of the cutter shaft 16 and a portion of the cutter head 18. A distal portion of the cutter housing 20 has an exterior thread 20A for forming the threaded connection with the case housing 22. A first rotational bearing 30 supports the cutter housing 20 on the intermediate portion of the cutter shaft 16, and a second rotational bearing 32 spaced distally from the first bearing supports the cutter housing on the distal portion of the cutter shaft. In the illustrated embodiment, the first bearing 30 comprises a roller bearing, and the second bearing 32 comprises a needle bearing.

Figure 2:
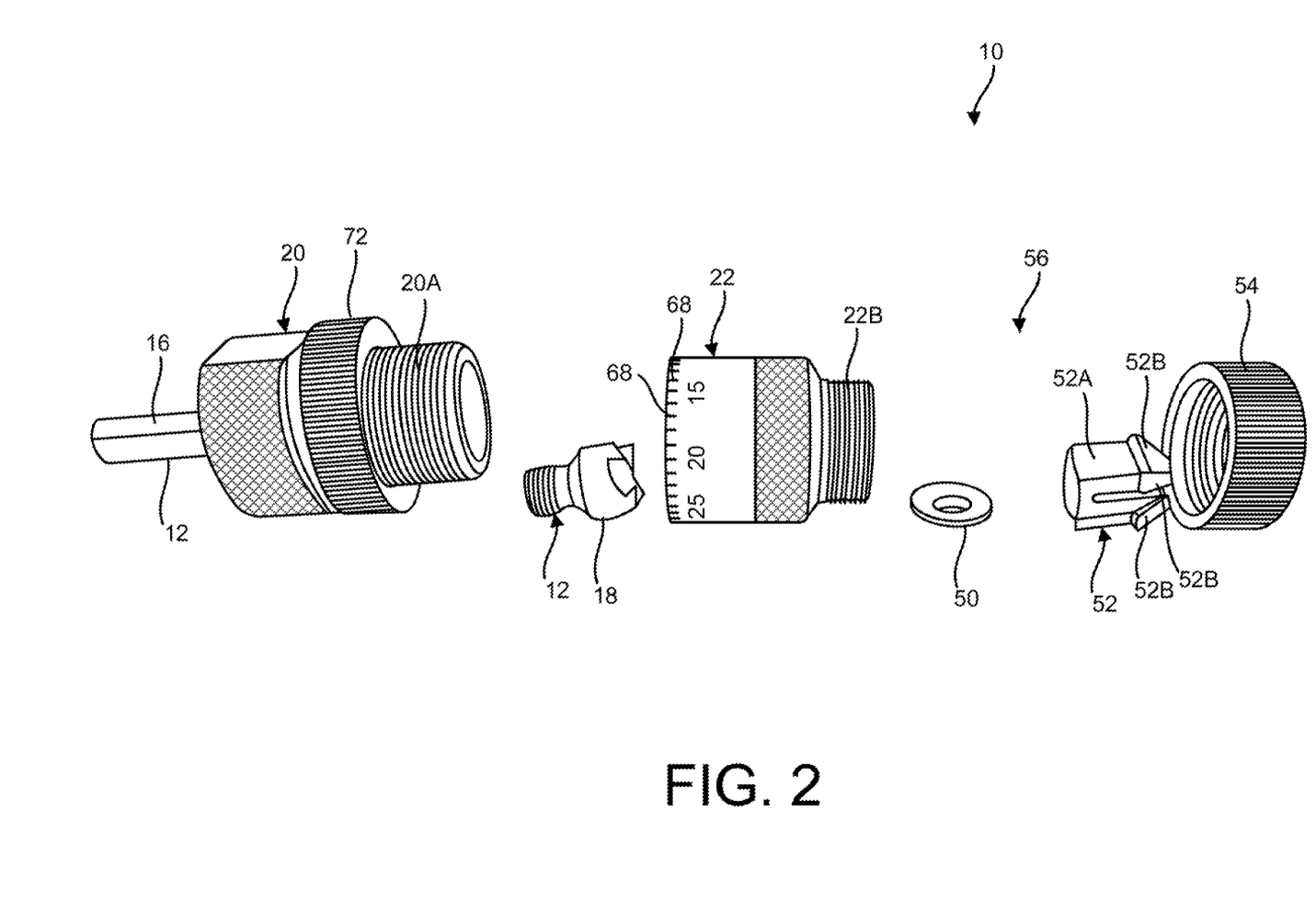
FIG. 2 is an exploded perspective of the ammunition case trimmer.
Figure 3:
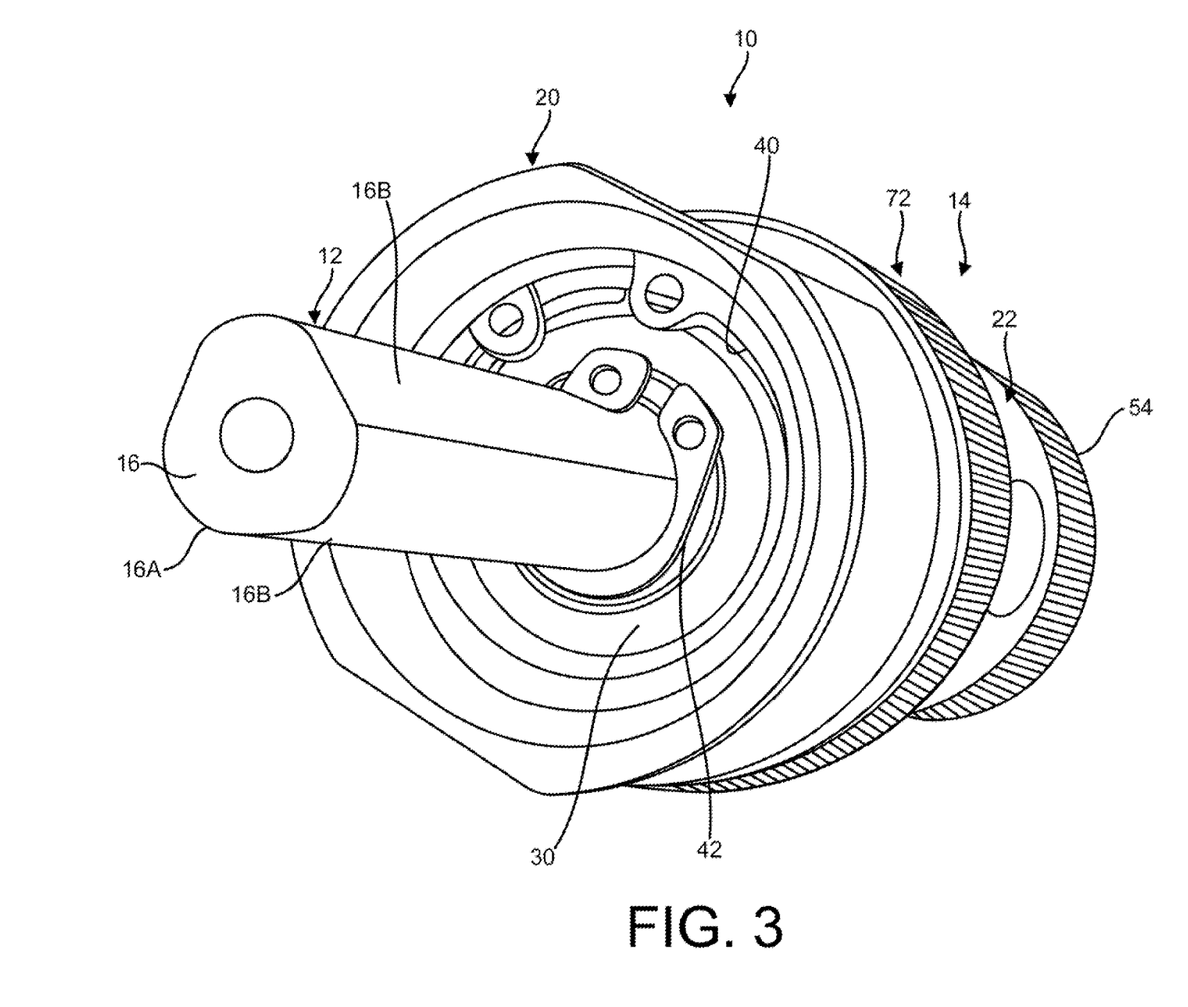
FIG. 3 is a rear perspective of the ammunition case trimmer.
Figure 4:
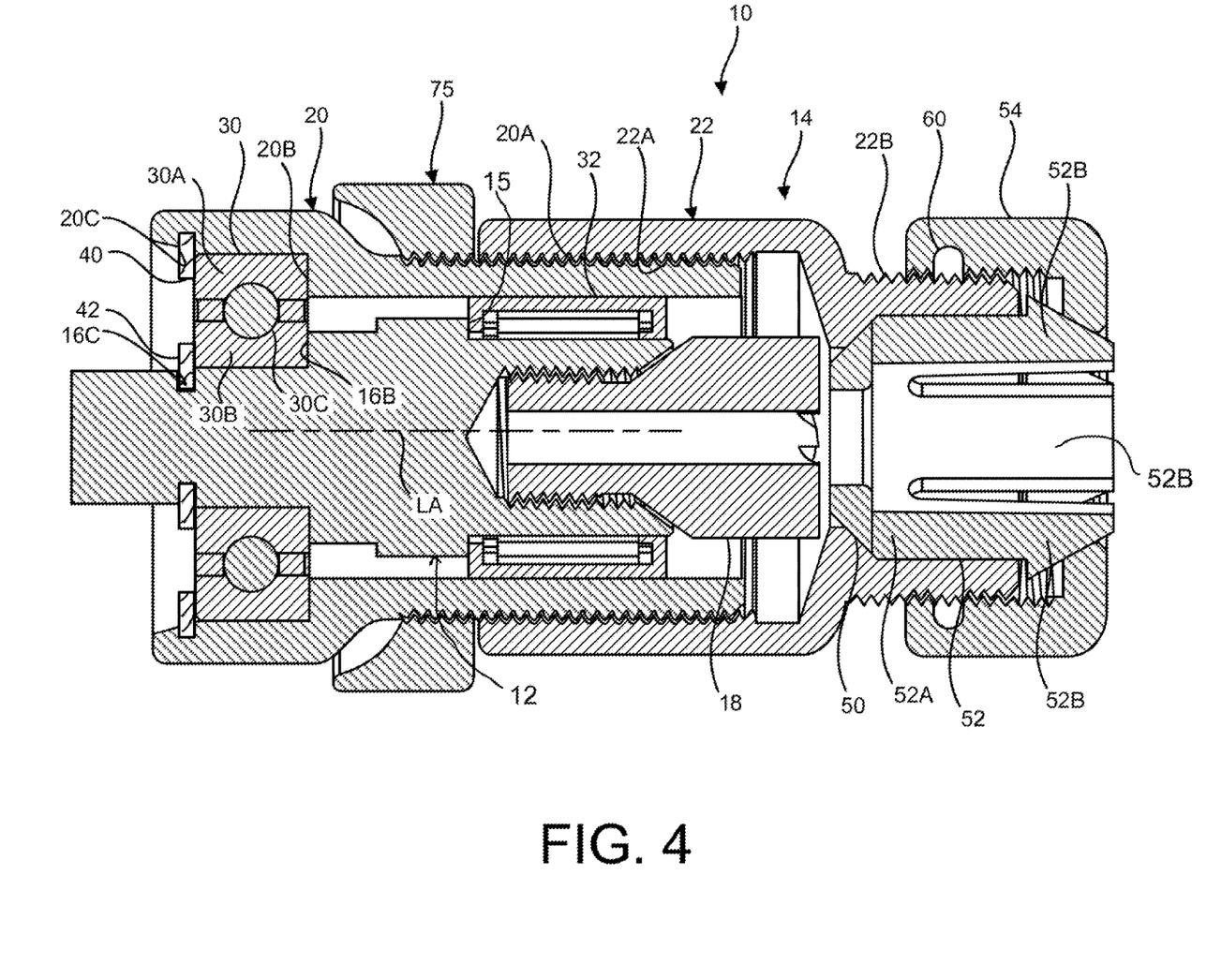
FIG. 4 is a section of the ammunition case trimmer.

The needle bearing 32 is mounted on a distal end portion of the cutter shaft 16 adjacent the cutting head 18. The cutter shaft 16 has distally facing shoulder 15 against which the needle bearing 32 is seated. The engagement of the shoulder 15 with the needle bearing limits distal axial movement of the cutter with respect to the needle bearing 32.

A proximal end of the cutter housing 20 includes a bearing receiver for housing the roller bearing 30. The bearing receiver includes a generally annular cavity opening out of the proximal end of the cutter housing. An annular shoulder 20B of the cutter housing 20 protrudes radially inwardly at a distal end of the annular cavity and defines the distal end of the bearing receiver. In the illustrated embodiment, the bearing 30 has an inner race 30A, an outer race 30B, and a plurality of ball bearings 30C therebetween. The outer race 30A is in engagement with the shoulder 20B, and the inner race 30B is free from engagement with the shoulder 36. The inner race 30B engages the shoulder 16B of the cutter shaft 16. The bearing 30 is retained in the bearing receiver by a first retainer 40 (e.g., clip referred to as an internal circlip) releasably received in an annular groove 20C in the cutter housing 20. A second retainer 42 (e.g., clip referred to an external circlip or E-clip) is releasably received in the annular groove 16C in the cutter shaft 16. It will be appreciated that the retainers 40, 42 form shoulders similar to the shoulders 16B, 20B but which are releasably connected to the cutter housing 20 and cutter 12, respectively. The arrangement is such that the bearing 30 is secured in the cutter housing 20 by being captured between the shoulder 20B and the retainer 40, which are arranged to engage opposite sides of the bearing. And the cutter 12 is retained in position in the cutter housing 20 by the bearing being captured between the retainer 42 and the shoulder 16B, which are arranged to engage opposite sides of the inner race 30B. The first and second bearings 30, 32 support the cutter 12 with respect to the cutter housing 20, maintain the orientation of the cutter with respect to the cutter housing, and permit the cutter housing to rotate with respect to the cutter. The cutter 12 and bearing 30 can be installed in the cutter housing 20 by moving the cutter and bearing into the cutter housing via the open proximal end of the cutter housing and then installing the retainers 40, 42.

The shroud 14 further includes a bushing 50 (broadly, "case shoulder engagement member"), collet 52 (broadly, "case body engagement member"), and a cap 54 (broadly, "collet adjustment member"). The bushing 50, collet 52, and cap 54, together with the case housing 22, define a case guide 56 defining a mouth for receiving an ammunition case to be trimmed. The case guide 56 is configured to guide a case into position with respect to the cutter 12 for achieving a desired trim length of the case and a squarely trimmed case mouth. The proximal end of the case housing 22 has an internal thread 22A configured for making the threaded connection with the cutter housing 20. The proximal end of the case housing 22 houses the cutter head 18. The distal end of the case housing 22 defines a receiver in which the bushing 50 and collet 52 are received. The distal end of the case housing 22 has an external thread 22B over which the cap 54 is threaded to retain the bushing 50 and collet 52 in position in the receiver. Together, the bushing 50 and collet 52 may be referred to as a case bearing configured for guiding axial movement of a case toward the cutter 12 and positioning the case with respect to the cutter. The bushing 50 and collet 52 are shown as two separate parts, but it will be appreciated that they may be formed as a single piece or connected to each other without departing from the scope of the present disclosure.

The bushing 50 has an annular case shoulder engaging surface 50A adapted for engaging the shoulder of the case to center the mouth end of the case in the case guide 56 and position the case axially with respect to the cutter 12 for achieving a desired trimmed length of the case. A proximal end of the collet 52 engages the distal end of the bushing 50. Rotation of the cap 54 onto the case housing 22 presses the collet 52 against the distal end of the bushing 50. The bushing 50 has an inside diameter sized for engaging the shoulder of the case. Engagement of the case shoulder with the bushing 50 centers the front end of the case in the case guide 56 and positions the case axially with respect to the cutter 12 to prevent more than a desired amount of the case from being removed.

The collet 52 is adapted for engaging the body of the case to center a rear portion of the case in the case guide 56 and, in combination with the bushing 50, align a longitudinal axis of the case with the longitudinal axis LA of the cutter 12 for achieving a squarely trimmed case mouth. The collet 52 includes a proximal annular portion 52A and four fingers 52B extending distally from the annular portion. Other numbers of fingers may be used without departing from the scope of the present invention. The fingers 52B are spaced from one another about the circumference of the collet 52 to permit the fingers to deflect radially inward. Each finger includes an outer bearing surface which tapers radially outward from a distal end of the bearing surface to a proximal end of the bearing surface. The cap 54 includes a corresponding tapered interior annular bearing surface extending around an opening which permits entry of the case into the case guide 56. Rotation of the cap 54 tending to draw the cap toward the cutter 12 moves the annular bearing surface of the cap proximally along the finger bearing surfaces. An O-ring 60 received in an annular recess in the cap 54 secures the cap in a particular rotational position by frictional engagement with the case housing 22 and the cap. The cap 54 may be rotated to cause the fingers 52B to deflect sufficiently inward so that inner surfaces of each finger (broadly "case body engagement surfaces") adjacent the ends of the fingers engage the case body. Engagement of the case body by the fingers 52B at various circumferential positions on the case body centers the body of the case with respect to the cutter 12. It will be appreciated that this step may be performed as an initial step to position the collet fingers 52B appropriately for the particular diameter of the case body before energizing the cutter 12. The engagement of the case shoulder with the bushing 50 and the engagement of the case body with the collet fingers 52B aligns the longitudinal axis of the case with the longitudinal axis LA of the cutter 12 for achieving a squarely trimmed case mouth when it is engaged with the rotating cutter.

Figure 5:
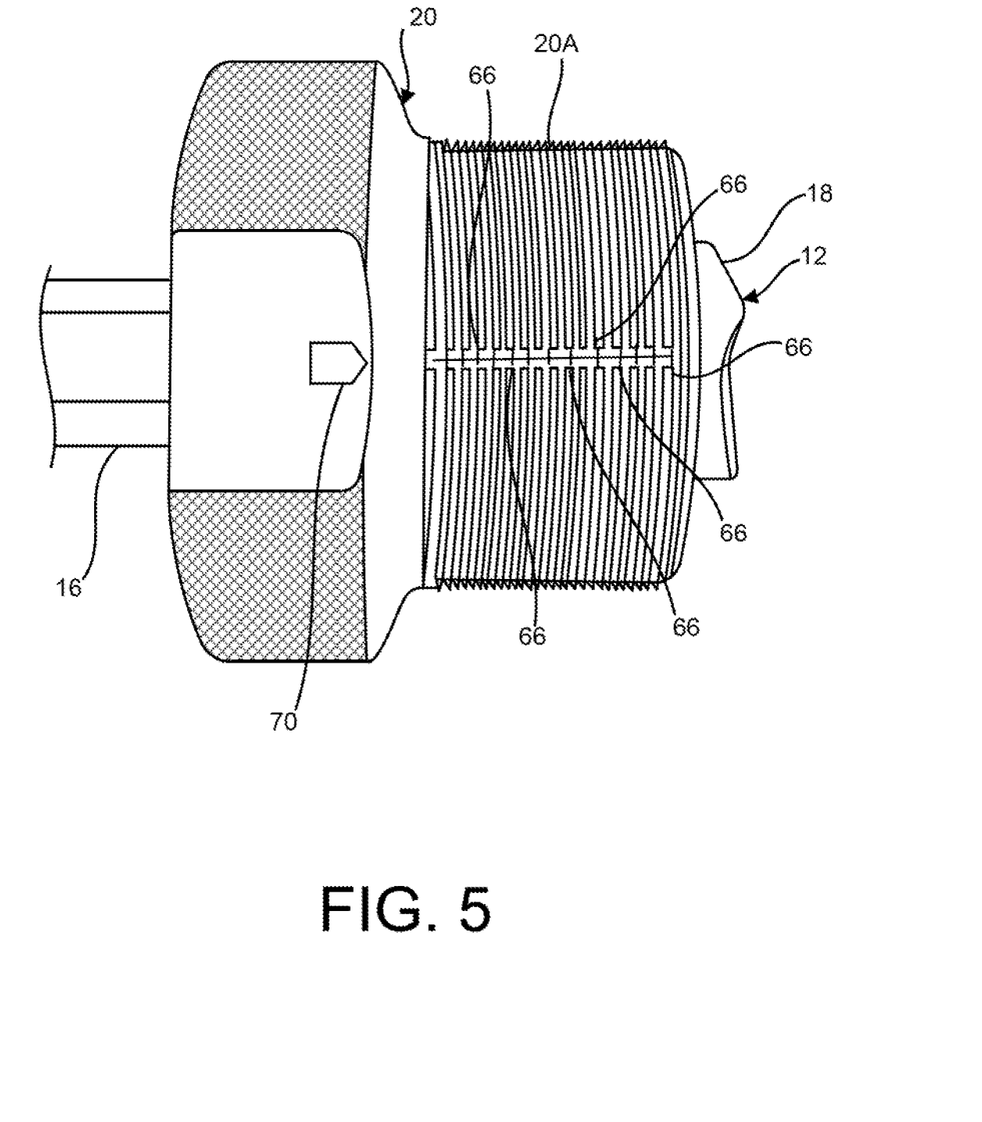
FIG. 5 is a perspective of a cutter housing and cutter of the ammunition case trimmer.

The length to which the case is trimmed may be adjusted by moving the position of the case shoulder bearing surface of the bushing 50 with respect to the cutter 12. This can be accomplished by rotating the case housing 22 to advance it distally or proximally with respect to the cutter housing 20, depending on whether the amount of the case to be trimmed off is to be decreased or increased. As shown in FIG. 5, the cutter housing 20 may include measurement marks 66 (broadly, "indicators") spaced from one another along a strip interrupting the exterior thread 20A of the cutter housing. These measurement marks 66 can be referenced with respect to the proximal end of the case housing 22 for coarse adjustment. The case housing 22 includes clocking marks 68 (broadly, "indicators") extending around a circumference of the proximal end of the case housing. The clocking marks 68 can be used by reference to a reference mark 70 (FIG. 5) on the cutter housing 20 for making micro adjustments. When the threaded connection of the case housing 22 and cutter housing 20 is adjusted as desired, the case housing can be secured in position with respect to the cutter housing by threading a jam nut 72 (broadly, "lock") on the exterior thread 20A of the cutter housing into abutting engagement with the proximal end of the case housing. Frictional engagement of the jam nut 72 with the case housing 22 locks the case guide 56 in position with respect to the cutter housing 20 and thus locks the bushing 50 in position with respect to the cutter head 18.

As is now apparent, the trimmer 10 can be adjusted in various ways to facilitate trimming a case to have a desired length and a square mouth. The bushing 50 can be moved axially with respect to the cutter 12 by rotating the case guide 56 with respect to the cutter housing 20. The collet fingers 52B can be deflected radially inward for engaging the case body. This provides adjustability for accommodating cases of a wide variety of cartridges of varying body, neck, shoulder, and mouth dimensions and different required trimmed lengths. The range of adjustability can be increased by providing a plurality of interchangeable bushings and/or collets. For example, bushings having different internal diameters may be provided to enable a user to select a bushing sized appropriately for engaging a shoulder of a particular case. Likewise, a plurality of collets having different internal diameters may be provided to enable a user to select a collet sized appropriately for engaging the body of a particular case. In general, a smaller diameter case body may require a bushing or collet having a smaller inner diameter, and a larger diameter case body may require a bushing or collet having a larger inner diameter. Furthermore, a smaller diameter case neck may require a bushing having a smaller inner diameter, and a larger diameter case neck may require a bushing having a larger inner diameter. The bushing and collet being separate from each other enables the user to choose any bushing/collet combination. The bushing 50 and collet 52 can be swapped with other bushings and collets by removing the cap 54 from the end of the case housing 22. The plurality of bushings and/or collets may be provided as a kit together with the trimmer 10. However, it will be appreciated that the bushing and collet can be unitary, and the bushing and/or collet can be omitted, without departing from the scope of the present disclosure.

After the trimmer 10 has been adjusted according to the case to be trimmed (e.g., by selecting and installing an appropriately sized bushing 50 and collet 52, adjusting the position of the bushing axially with respect to the cutter 12, and adjusting the inner diameter of the collet), trimming may be accomplished by holding a rear end of the case body by hand and pushing the mouth of the case into the open end of the case guide 56. As the case is advanced toward the cutter 12, the case body engages the collet 52. As the mouth of the case moves closer to the cutter 12, the mouth and/or neck of the case may engage the bushing 50, which begins to guide the mouth of the case into a centered position with respect to the cutter. By the time the case mouth engages the cutter 12, engagement of the case shoulder with the bushing 50 and engagement of the case body with the collet 52 has caused the case mouth to be centered with respect to the cutter and caused the longitudinal axis of the case to be aligned with the longitudinal axis LA of the cutter. The bushing 50 positively locates the case axially with respect to the cutter 12, defining the trim length. When the case mouth engages the rotating cutter head 18, the result is the case is trimmed to the desired length and has a squarely trimmed mouth. Case after case may be inserted in the case guide 56 for trimming a plurality of cases.

The trimmer 10 offers enhanced user safety because of the exterior surfaces of the cutter housing 20, jam nut 72, and case guide 56 are freely rotatable with respect to the cutter 12. The first and second bearings 30, 32 permitting rotation of the cutter housing 20 with respect to the cutter 12 also permit rotation of the case guide 56 with respect to the cutter. When the case guide 56 is selectively locked in position with respect to the cutter housing 20 by the jam nut 72, the case guide and cutter housing are conjointly rotatable with respect to the cutter 12. If a user's hand comes into contact with an outer surface or exterior of the shroud 14 while the cutter 12 is rotating quickly, the shroud would rotate with respect to the cutter and the user's hand would not be harmed. If desired, a user could apply their hand to the shroud 14 (e.g., wrap their hand around the shroud) to prevent the shroud from rotating while using the trimmer 10. Substantially all or most of the proximal free end 16A of the cutter shaft 16 is received in the chuck of the drill, and substantially all exterior surfaces of the trimmer 10 exposed when the trimmer is mounted on the chuck of a drill are rotatable with respect to the drill to prevent harm to the user. The shroud 14 is free from connection to the chuck of the drill or other part of the drill which would fix rotation of the shroud with respect to the rotational drive of the drill.

It will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. An ammunition case trimmer for use with a drill including a chuck, the ammunition case trimmer comprising:
   a cutter, the cutter including a cutting head and a shaft extending proximally from the cutting head, the cutter including a proximal free end and being rotatable about an axis of rotation;
   a shroud supporting the cutter, the shroud including a case guide defining a mouth for receiving an ammunition case to be trimmed, the case guide including a case engagement surface arranged to locate the case with respect to the cutting head, the shroud including a cutter housing extending proximally of the case guide, the case guide being selectively movable with respect to the cutter housing to move the case engagement surface axially for changing a length to be trimmed from the ammunition case; and a first rotational bearing supporting the cutter in the cutter housing for rotation about the axis of rotation, the first rotational bearing permitting conjoint rotation of the cutter housing and the case guide with respect to the cutter about the axis of rotation;

wherein the ammunition case trimmer is in a fully assembled configuration and the proximal free end of the cutter is unobstructed by the ammunition case trimmer such that the proximal free end is receivable in and rotatable by the chuck of the drill without obstruction by the ammunition case trimmer.

2. An ammunition case trimmer as set forth in claim 1, wherein the cutter extends proximally of a proximal end of the shroud, and the case guide is conjointly rotatable with the proximal end of the shroud with respect to the cutter.

3. An ammunition case trimmer as set forth in claim 1, further comprising a second rotational bearing supporting the cutter in the shroud.

4. An ammunition case trimmer as set forth in claim 3, wherein the first rotational bearing comprises a roller bearing including an inner race, an outer race, and a plurality of ball bearings therebetween, and the second rotational bearing comprises a needle bearing.

5. An ammunition case trimmer as set forth in claim 1, wherein the case guide is connected to the cutter housing by a threaded connection by which the case guide is rotatable with respect to the cutter housing to move the case engagement surface axially with respect to the axis of rotation.

6. An ammunition case trimmer as set forth in claim 5, wherein the cutter housing is generally tubular and is threaded to the case guide at the threaded connection.

7. An ammunition case trimmer as set forth in claim 1, wherein the rotational bearing is captured with respect to the cutter between a first shoulder and a second shoulder to limit proximal and distal axial movement of the cutter with respect to the rotational bearing.

8. An ammunition case trimmer as set forth in claim 1, wherein the rotational bearing is captured with respect to the shroud between first and second shoulders to limit proximal and distal axial movement of the rotational bearing with respect to the shroud.

9. An ammunition case trimmer as set forth in claim 1, further comprising first and second shoulders arranged to engage the rotational bearing, the first shoulder arranged to limit axial movement of the cutter with respect to the rotational bearing, and the second shoulder being arranged to limit axial movement of the rotational bearing with respect to the shroud.

10. An ammunition case trimmer for use with a drill including a chuck, the ammunition case trimmer comprising:

a cutter, the cutter including a cutting head and a shaft extending proximally from the cutting head, the cutter including a proximal free end and being rotatable about an axis of rotation;

a shroud at least partially housing the cutter, the shroud including a case guide defining a mouth configured to receive an ammunition case to locate the ammunition case with respect to the cutting head to be trimmed by the cutting head;

a first rotational bearing supporting the cutter for rotation with respect to the shroud about the axis of rotation;

a first shoulder arranged to engage the first rotational bearing to limit axial movement of the cutter with respect to the bearing; and wherein the ammunition case trimmer is in a fully assembled configuration and the proximal free end of the cutter is unobstructed by the ammunition case trimmer such that the proximal free end is receivable in and rotatable by the chuck of the drill without obstruction by the ammunition case trimmer.

11. An ammunition case trimmer as set forth in claim 10, further comprising a second shoulder arranged to limit distal axial movement of the cutter with respect to the rotational bearing, and wherein the first shoulder limits proximal axial movement of the cutter with respect to the rotational bearing.

12. An ammunition case trimmer as set forth in claim 11, wherein the second shoulder is arranged to engage the first rotational bearing to limit distal axial movement of the cutter with respect to the rotational bearing.

13. An ammunition case trimmer as set forth in claim 11, wherein a retainer releasably connected to the cutter defines at least one of the first shoulder or the second shoulder.

14. An ammunition case trimmer as set forth in claim 10, further comprising a second shoulder arranged to engage the first rotational bearing to limit axial movement of the rotational bearing with respect to the shroud.

15. An ammunition case trimmer as set forth in claim 10, further comprising a second shoulder, a third shoulder, and a fourth shoulder, the first shoulder being arranged to limit proximal axial movement of the cutter with respect to the rotational bearing, the second shoulder being arranged to limit distal axial movement of the cutter with respect to the rotational bearing, the third shoulder being arranged to limit distal axial movement of the rotational bearing with respect to the shroud, the fourth shoulder being arranged to limit proximal axial movement of the rotational bearing with respect to the shroud, at least one of the second, third, or fourth shoulders arranged to engage the first bearing.

16. An ammunition case trimmer for use with a drill including a chuck, the ammunition case trimmer comprising:

a cutter, the cutter including a cutting head and a shaft extending proximally from the cutting head, the cutter including a proximal free end and being rotatable about an axis of rotation;

a shroud at least partially housing the cutter, the shroud including a case guide defining a mouth configured to receive an ammunition case to locate the ammunition case with respect to the cutting head to be trimmed by the cutting head;

a first rotational bearing supporting the cutter for rotation of the cutter with respect to the shroud about the axis of rotation; and a first retainer releasably connected to the shroud and arranged to limit proximal movement of the rotational bearing with respect to the shroud;

wherein the ammunition case trimmer is in a fully assembled configuration and the proximal free end of the cutter is unobstructed by the ammunition case trimmer such that the proximal free end is receivable in and rotatable by the chuck of the drill without obstruction by the ammunition case trimmer.

17. An ammunition case trimmer as set forth in claim 16, wherein the first retainer defines a shoulder arranged to engage the rotational bearing to limit proximal movement of the rotational bearing with respect to the shroud.

18. An ammunition case trimmer as set forth in claim 17, wherein the first retainer comprises a circlip.

19. An ammunition case trimmer as set forth in claim 16, further comprising a second retainer releasably connected to the cutter and arranged to limit proximal axial movement of the cutter with respect to the rotational bearing.

20. An ammunition case trimmer as set forth in claim 19, wherein the first retainer comprises a first circlip, and the second retainer comprises a second circlip.

21. An ammunition case trimmer as set forth in claim 1, wherein in said fully assembled configuration the ammunition case trimmer is free of a driver different from said drill configured to drivingly rotate the cutter.

22. An ammunition case trimmer as set forth in claim 1, wherein the shroud is free of a mount configured to secure the shroud to a support surface to hold the shroud in position.

23. An ammunition case trimmer as set forth in claim 1, wherein in said fully assembled configuration the cutter housing and case guide are freely rotatable about the axis of rotation.

24. An ammunition case trimmer as set forth in claim 1, in combination with the drill.

25. An ammunition case trimmer as set forth in claim 10, wherein the shroud is free of a mount configured to secure the shroud to a support surface to hold the shroud in position.

26. An ammunition case trimmer as set forth in claim 16, wherein the shroud is free of a mount configured to secure the shroud to a support surface to hold the shroud in position.

* * * * *